United States Patent [19]

Pohjola

[11] Patent Number: 4,905,635
[45] Date of Patent: Mar. 6, 1990

[54] VALVE GEAR FOR INTERNAL COMBUSTION ENGINE

[76] Inventor: Jorma Pohjola, Merituuli, Hailuodontie, 90460 Oulunsalo, Finland

[21] Appl. No.: 314,714

[22] Filed: Feb. 23, 1989

[30] Foreign Application Priority Data

Feb. 23, 1988 [FI] Finland .................................. 880847

[51] Int. Cl.⁴ ............................................ F02B 75/04
[52] U.S. Cl. .................................. 123/48 R; 123/48 A
[58] Field of Search ............ 123/48 A, 48 R, 188 VA, 123/79 C

[56] References Cited

U.S. PATENT DOCUMENTS

| | | | |
|---|---|---|---|
| 2,840,059 | 6/1958 | Buchi | 123/79 C |
| 2,979,046 | 4/1961 | Buchi | 123/79 C |
| 2,988,071 | 6/1961 | Weir | 123/90.26 |

*Primary Examiner*—E. Rollins Cross
*Attorney, Agent, or Firm*—Steinberg & Raskin

[57] ABSTRACT

The present inventio relates to a valve gear for an internal combustion engine. The internal combustion engine has one or more cylinders and a piston reciprocating therein as well as a cylinder head mounted on an upper end of the cylinder. At least one exhaust valve opening into an exhaust channel and at least one suction valve opening into a suction channel are arranged in each cylinder. The valves are operated by transmission of a cam shaft or the like. In accordance with the present invention, the size of a combustion space of the cylinders is adapted to be changed in a force-controlled manner periodically during one crankshaft revolution by way of a movable sleeve fitted around at least one valve. This sleeve is arranged, together with the valve, to penetrate into the combustion space for reducing the combustion space. The sleeve or sleeves can be arranged around the suction valve or valves and/or around the exhaust valve or valves.

20 Claims, 10 Drawing Sheets

VALVE GEAR FOR INTERNAL COMBUSTION ENGINE

BACKGROUND OF THE INVENTION

The present invention relates to a valve gear for an internal combustion engine, the engine comprising one or more cylinders and a piston reciprocating therein, as well as a cylinder head mounted on an upper end of the cylinder. At least one exhaust valve opening into an exhaust channel and at least one suction valve opening into a suction channel are arranged for each cylinder, these valves being operated by transmission of a cam shaft or the like.

In conventional internal combustion engines (four-stroke engines), the suction and escape valves of each cylinder are simultaneously open for a predetermined period of time due to engine flushing (exhaust gases). For example, the suction valve will open by 20 crank degrees before the end of the exhaust stroke, i.e. the top dead center, while the escape valve will close by 15 crank degrees after the dead end center. In such a case, the suction and escape valves are thus simultaneously open by 35 crank degrees. As a result, incombustible fuel-air mixture will enter the exhaust channel, whereby, due to the heat and incombustability of the exhaust gases (there is insufficient oxygen in the exhaust channel needed for combustion), the exhaust gases will contain a large quantity of detrimental carbon monoxide and hydrocarbons due to the incomplete combustion.

Due to the simultaneous opening state of the suction and escape valves, it has not been possible to increase the supercharger pressures in conventional engines provided with turbo-supercharges as desired, since excess-pressure air produced by the superchargers will flow directly out of the escape valves. For this reason, inter alia, a certain considerable delay is always present in conventional engines provided with superchargers when pressing the gas pedal, while the engine does not react immediately to the pressing of the gas pedal.

Additionally, since air can flow in such structures into the escape channel, this will bring along an incomplete combustion in the escape channel, as a result of which the exhaust gases will contain a large quantity of detrimental carbon monoxide. If the valves do not have a common opening-state time, a large quantity of remainder exhaust gases will, in the cases concerned, remain in the combustion space of the engine. In such a case, the suction air entering the engine will heat and its volume will increase. Thus, filling the cylinder with the fuel-air mixture will remain insufficient, and formation of the carbon monoxide will similarly occur to a great extent.

For reducing detrimental exhaust gases, an attempt has been made to develop internal combustion engines, for example, in such a way that combustion therein would be as complete as possible. One solution to achieve this goal has previously been, for example, varying the compression ratio of the engine and especially the volume of the combustion space during the engine operation. Such solutions have been previously described, for example, in EP application No. 82,925; DE application No. 3,526,961; and GB application No. 2,000,551. In U.S. Pat. Nos. 2,988,071 and 2,979,046, solutions have in turn been described in which the opening-state times of the suction and escape valves have been limited so that there simultaneous opening-state time would be as short as possible. In both these latter U.S. Patents, this has been achieved so that the suction and escape valves are arranged "one within the other" coaxially, with their timing having been achieved in the previously-described manner.

In the previously-noted publications, in which the EP, DE and GB publications relate to engines provided with a varying compression ratio, the construction has generally required a fairly complex counter-piston arrangement or the like. Solutions in accordance with the prior art also include several other drawbacks. In the previous-described EP publication, it can be emphasized that in an engine according to this reference, there is always a space between the counter-piston and the actual piston, in which space remainder gases may remain. In this solution, gas exchange may thus not be sufficiently satisfactory, whereby most of the advantages, which the solution of the EP publication concerned is intended to achieve, will be lost. The changing of the compression ratio into a forced-operation state during engine operation at every crankshaft revolution requires, in the solution according to the EP publication, also a very complex crank and lever mechanism.

SUMMARY OF THE INVENTION

Accordingly, it is an object of the present invention to achieve an engine in which the exhaust gases produced by the engine are essentially completely free of carbon monoxide and also partially of hydrocarbons, and which engine is furthermore provided with better gas exchange in comparison with the prior art.

More specifically, it is an object of the present invention to achieve a valve gear for an internal combustion engine which is adapted to the engine and will produce the above-noted desirable effects.

Additionally, it is another object of the present invention to eliminate the disadvantages and drawbacks related to the prior art.

These and other objects are attained by the present invention which is directed to a valve gear for an internal combustion engine having at least one cylinder, a piston reciprocating in the cylinder, a cylinder head mounted on an upper end of the cylinder and in which at least one exhaust valve opening into an exhaust channel and at least one suction valve opening into a suction channel are arranged, the exhaust and suction valves being operated by transmission of a cam shaft or equivalent element. In the cylinder head, at least one of the valves is provided with a sleeve mounted for coaxial movement in the same direction as the respective valve for changing volume of a combustion space defined in the cylinder in a force-controlled manner periodically during crankshaft rotation. Thus, the sleeve is arranged to individually penetrate from the cylinder head into the combustion space with the respective valve for reducing the combustion space.

Thus, in order to attain the objects noted above and those which will become apparent below in greater detail, the present invention is principally characterized by the cylinder head being provided at least around one valve, with a sleeve moving axially in the same direction as the respective valve for changing volume of a combustion space of the cylinder in a force-controlled manner periodically during the crankshaft rotation, so that the sleeve is arranged to penetrate from the cylinder head into the combustion space individually with the respective valve, for reducing the combustion space.

Several important advantages can be achieved by means of the present invention, these advantages including, for example, the following. The solution in accordance with the present invention improves the performance of the engine. This is caused by the fact that during the exhaust stroke and especially at the end phase of the exhaust stroke, the combustion space volume is essentially zero. No remainder gases will remain in the combustion space (such gases would heat the fuel-air mixture). As a result, the mixture will enter the cylinder in a colder state, which results in more efficient combustion and a higher combustion potential, and which in turn results from a more efficient and compact cylinder filling.

In the solution in accordance with the present invention, the valve timing does not necessarily have to be changed, however the invention provides the possibility of changing the timing so that a simultaneous opening state of the suction and exhaust valves will not necessarily be required at all. This will in turn provide an additional advantage in such a way that energy, especially kinetic energy of the suction air, is not essentially needed for flushing the cylinder and the valves, rather all energy being available for the combustion occurrence itself. Because of this, the specific capacity of the engine will improve and the fuel combustion will also decrease, since no incombustable fuel-air mixture can enter the combustion channel.

In the case of turbo-supercharged engines, the solution in accordance with the present invention will provide an operation with essentially no delay, since in the arrangement according to the invention the cylinder does not have flushing corresponding to conventional solutions, whereby the excess pressure produced by the supercharger cannot escape from the exhaust valve, since the construction of the present invention will minimize the quantity of the remainder gases in the combustion space. Also, in the case of the turbo-supercharged solution, the invention will provide a better (maximum) cylinder filling. The power requirement set in connection with the engine design can be reached with a smaller turbo construction. The exhaust gases of the engine are clean. The carbon monoxide content is very low, since no suction air or fuel-air mixture can enter the exhaust channel system due to the valve timing.

The fuel consumption is lower with respect to each unit of power produced. Furthermore, the efficiency will improve because of a gas exchange with a more accurate control, and thus no incombustible or partly-combustible fuel-air mixture can escape with the exhaust gases.

BRIEF DESCRIPTION OF THE DRAWINGS

The present invention will be described in greater detail below by way of exemplary embodiments illustrated in the figures, and to which the present invention is not intended to be soly confined. In the drawings.

DESCRIPTION OF THE PREFERRED EMBODIMENTS

In the figures, the cylinder of the engine is designated with reference numeral 1. Reference numeral 2 relates to a piston reciprocating in the cylinder 1, with reference numeral 3 generally denoting a cylinder head. The head 3 is, in a normal manner, provided with an escape valve 7 opening into an escape channel 8 and with a suction valve 12 opening into a suction channel 13. Additionally, an ignition plug 6 is mounted on the head 3 in a conventional manner, and with electrodes partially penetrating from a plane 4 of the head 3 into a combustion space 5.

In the embodiment illustrated in FIGS. 1-5, the exhaust valve 7 is of conventional structure and comprises a spring 9 fitted around a valve shaft 10, the spring 9 loading the exhaust valve 7 to the closed position. On an upper end of the exhaust-valve shaft 10, a plate 11 is located, into which the exhaust valve 7, either by direct action of a cam of a cam shaft or through a rocker arm, is opened at a predetermined moment against the force of the spring 9.

The construction and mounting mode of the suction valve 12 is essentially distinct from conventional solutions and design. In a solution of the present invention, the suction valve 12 is movably mounted upon a sleeve 15 having a lower edge forming a seat surface for the suction valve 12.

A coaxial boring is formed in the head 3 (with a suction-valve shaft 16) for the sleeve 15. The sleeve 15 is movably fitted into this boring. The sleeve 15 is loaded with a spring 17 onto a bottom of the boring formed in the head 3, and a cup-shaped part 18 is fitted on an upper end of the spring 17, this cup-shaped part 18 acting upon the sleeve 15 through an arm 27, so that the cams formed on the cam shaft press the cup-shaped part 18 and move the sleeve 15 in its boring.

Furthermore, a counterpart 19 communicating with the valve shaft 16 is fitted inside the cup-shaped part 18, with the spring 24 of the suction valve 12 itself being fitted inside the counterpart 19. Thus, the suction valve 12 and the sleeve 15 have separate springs 24, 17. The suction-valve shaft 16 and the sleeve 15 are coaxially located with respect to one another and are fitted movably with respect to one another. An opening 26 is formed on the side of the sleeve 15, and opens into the suction channel 13.

Figure 1:
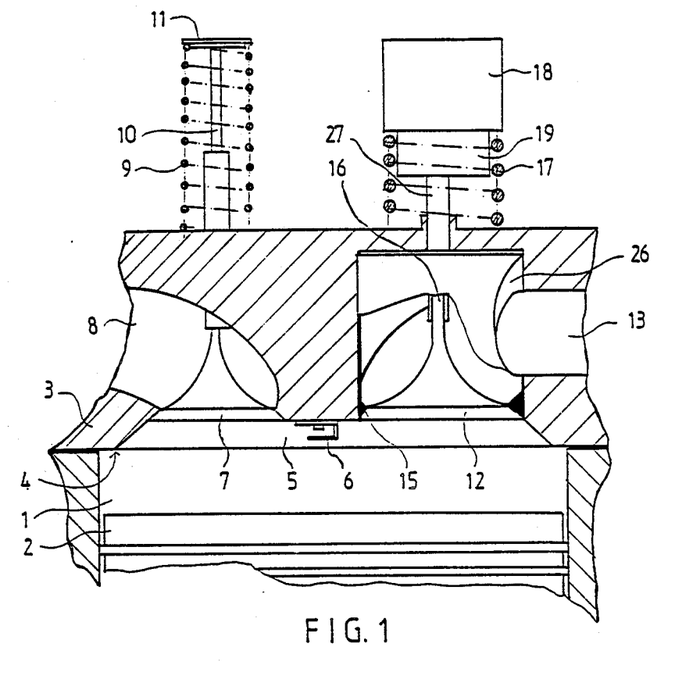
FIG. 1 is a schematic sectional view of an upper end of one cylinder and of part of a cylinder head of an engine according to the present invention, with valves in a closed position when the invention is adapted for only one valve.
Figure 2:
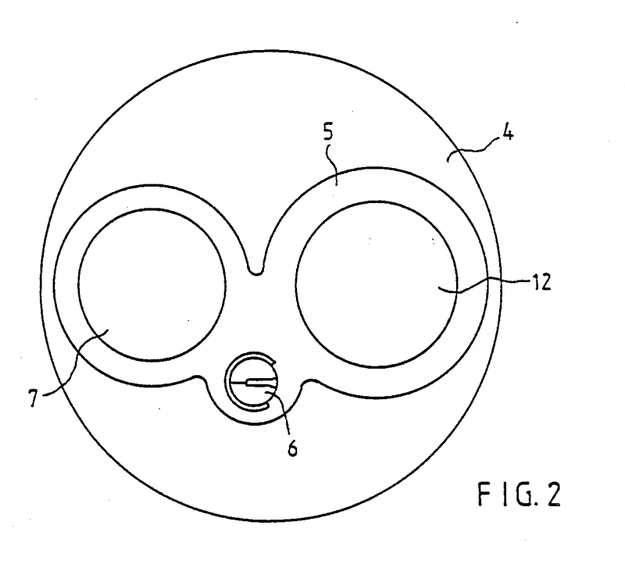
FIG. 2 is a view of a cylinder head in accordance with FIG. 1 as seen from the cylinder direction, and with the valves in a closed position.
Figure 3:
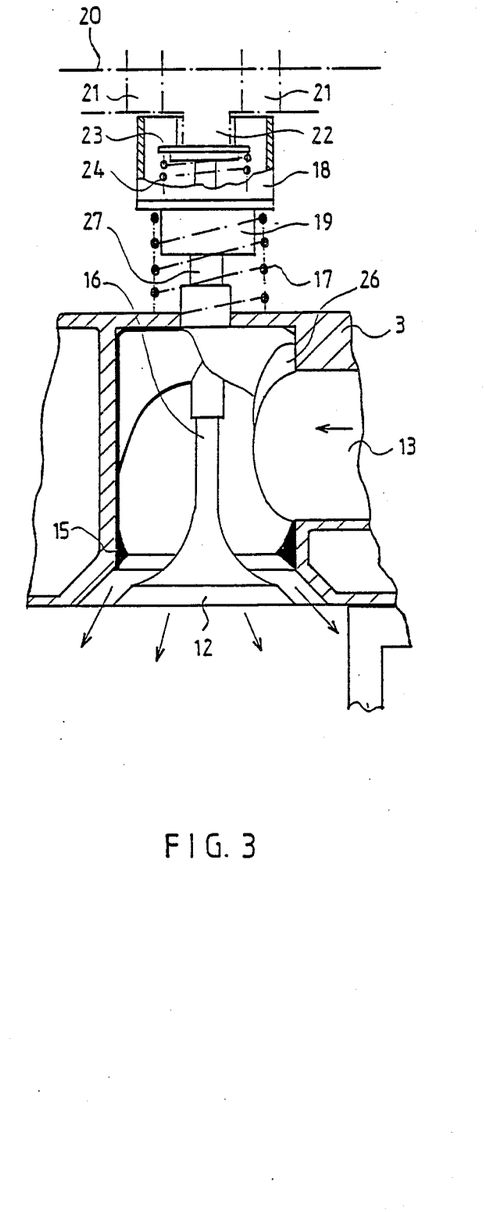
FIG. 3 is a schematic illustration of a suction valve in an open position during a suction stroke.

FIG. 3 illustrates operation of the suction valve 12 during the suction stroke. As noted above, the cam shaft 20 has separate cams 21 for the sleeve 15 and also has a separate cam 22 for the suction valve 12. In the case of FIG. 3, the suction valve 12 is in a conventional manner in an open state, as the cam 22 presses the end 23 of the valve shaft 16. Also, in the situation of FIG. 3, the cams 21 of the sleeve 15 are disengaged from the cup-shaped part 18, when the sleeve 15 is in its upper position. When the sleeve 15 is in this upper position, the bottom of the sleeve 15 contacts the bottom of the boring in the cylinder head 3.

Figure 4:
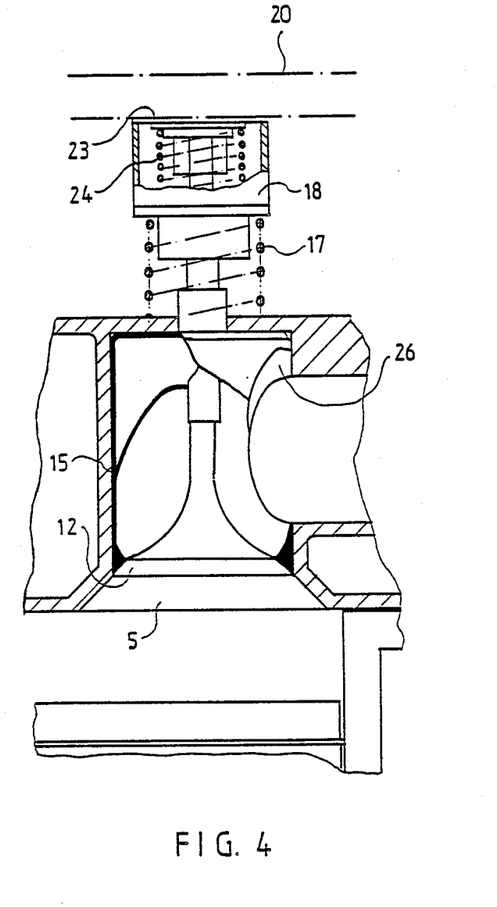
FIG. 4 is an illustration in accordance with FIG. 3 when the suction valve is closed during a compression and expansion stroke.
Figure 5:
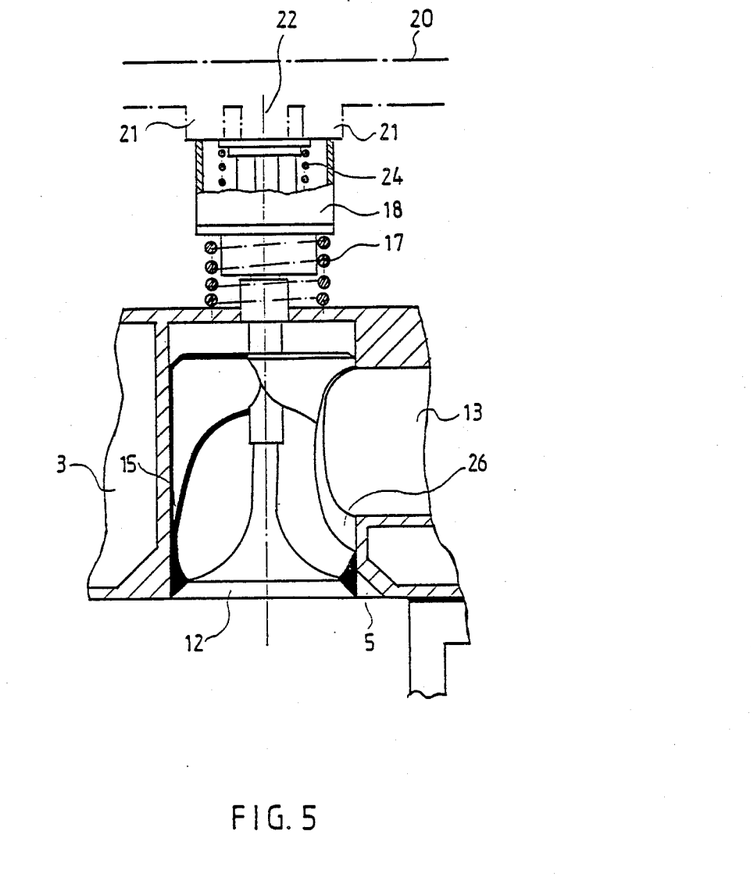
FIG. 5 is an illustration in accordance with FIGS. 3 and 4 of a suction valve during an exhaust stroke.

FIG. 4 illustrates a situation during a compression and expansion stroke, when the suction valve 12 has closed. Both the sleeve 15 and the valve 12 are then in the respective upper positions, and the cams on the cam shaft 20 do not affect the valve or the sleeve. FIG. 5 illustrates a situation during an exhaust stroke and especially the end phase of the exhaust stroke. In this situation, the cams 21 and 22 of the suction valve 12 and of the sleeve 15 press, on the one hand, against the upper end 23 of the valve shaft 16, and on the other hand, against the cup-shaped part 18 in such a manner that both the sleeve 15 and the valve 12 penetrate into the combustion space 5. In this situation, the suction valve 12 leans against a seat surface formed on a lower edge of the sleeve 15, whereby the suction valve 12 is closed.

Then, the suction valve 12 and the sleeve 15 form a piston-like piece which during the exhaust stroke penetrates into the combustion space and essentially reduces the size of the combustion space. The movements of the suction valve 12 and the sleeve 15 are timed by the design of the cams 21 and 22 so that when transferring from the exhaust stroke of FIG. 5 to the suction stroke of FIG. 3, the sleeve 15 rises rapidly up whereas the suction valve 12 still remains down. Thus, the suction valve remains in position and opens as a result of the movement of the sleeve 15.

The upward movement of the sleeve 15 is designed to be very rapid whereby at the start of the suction stroke, the suction valve 12 rapidly transfers into a completely open position. According to a useful feature of the invention, the suction valve begins opening more when the sleeve 15 starts rising and opening the suction valve 12. This solution essentially speeds up the opening of the suction valve 12 and/or the exhaust valve 7. A simultaneous sleeve and valve movement can also be utilized at a closing phase of the valves.

As described above with respect to FIG. 2, the combustion spaces 5 in the engine according to the present invention are essentially designed on the cylinder head 3 as a recess surrounding only the suction 12 and exhaust 7 valves, as well as the ignition plug 6. Thus, no combustion space will actually remain between the plane 4 of the head 3 and the end of the piston 2, since as the piston 2 enters top dead center, it is located at a very small clearance from the plane 4 of the head 3. Such a clearance can be of he order of about 1-2 mm.

Since at the end of the exhaust stroke, the size of the combustion space is essentially reduced by means of the sleeve 15 and the suction valve 12 in the manner described above, the combustion gases can be more efficiently forced to escape into the exhaust channel 8. Also, the exhaust valve 7 is naturally open during the exhaust stroke, which also partially reduces the size of the combustion space. Thus, the exit of the gases from the combustion space 5 is extremely efficient.

Another essential feature of the present invention is that the sleeve 15 rapidly rises up at the start of the suction stroke, whereby the suction valve is immediately completely open. At the start of the suction stroke, the exhaust valve 7 is closed, whereby a simultaneous opening state of the valves does not necessarily exist, while exhaust gas cannot flow from the exhaust channel 8 back into the combustion space 5. The valve timing described above and the changing of the compression ratio during engine operation make the exhaust gases efficiently escape from the combustion space 5. However, it is yet unnecessary to change the valve timing in the above-noted manner, although the additional advantages described above can be achieved by changing the timing.

Figure 6:
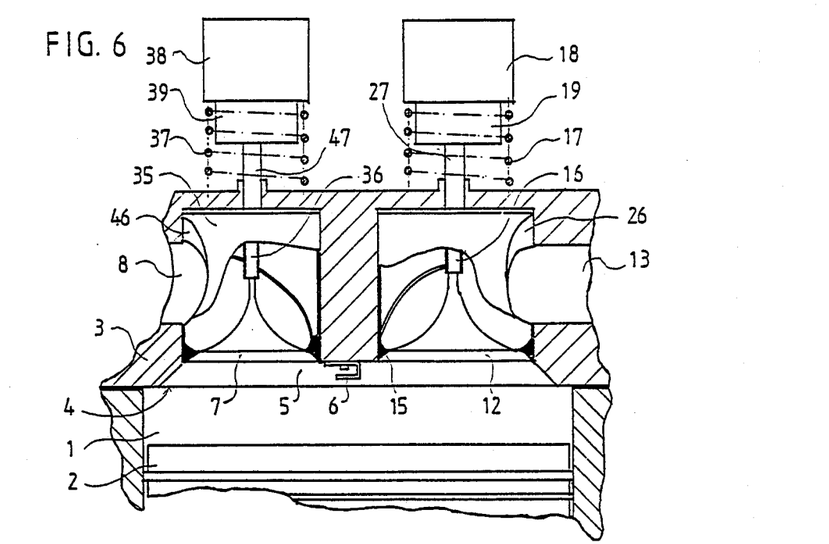
FIG. 6 is a sectional view of an alternative embodiment to the solution illustrated in FIG. 1, with valves in closed position.
Figure 7:
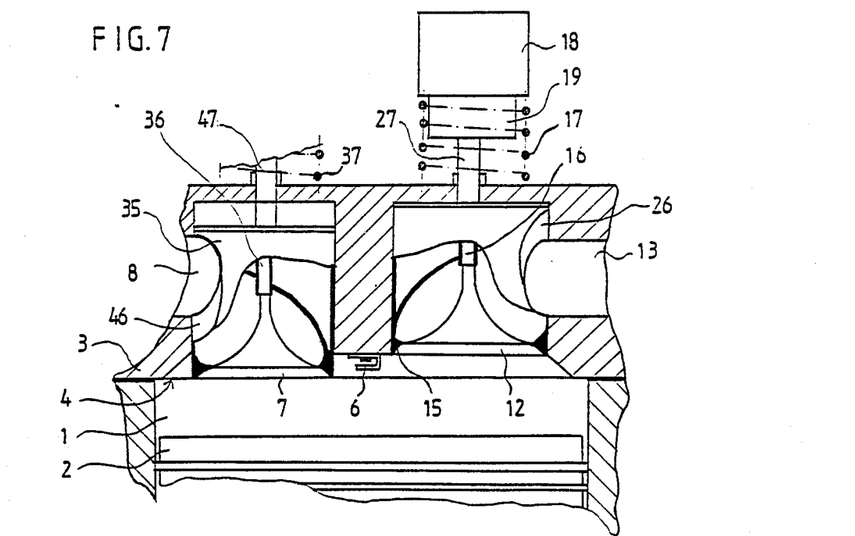
FIG. 7 is a view corresponding to the embodiment of FIG. 6, in which the exhaust valve is provided with a moving sleeve, with the exhaust valve and sleeve penetrating into the combustion space and the exhaust valve still being closed.

FIGS. 6 and 7 illustrate an alternative embodiment to the solution described in FIGS. 1-5. In the embodiment of FIGS. 6 and 7, the exhaust valve 7 is also provided with a sleeve 35, the arrangement of which corresponds to the sleeve 15 described in connection with the suction valve 12. Thus, a coaxial boring is also arranged for the sleeve 35 of the exhaust valve 7 on the head 3, the valve 7 being provided with an exhaust-valve shaft 36. The sleeve 35 is movably fitted into the boring.

The sleeve 35 is furnished with an arm 47 surrounding the exhaust-valve shaft 36, with a cup-shaped part 38 being fitted on an upper end of the arm 47 and being loaded by a spring 37 also contacting the head 3, with the sleeve 35 being drawn by this spring 37 towards the bottom of the boring formed on the head.

A counterpart 39 is fitted inside the cup-shaped part 38 and communicates with the exhaust-valve shaft 36. A spring (not illustrated) is fitted inside the counter part 39 of the exhaust valve 7 in a similar manner as described with respect to FIGS. 1-5 regarding the structure of the suction valve 12.

The gear and the gear mechanism of the exhaust valve 7 and the related sleeve 35 correspond to those illustrated above in conjunction with the suction valve 12, with the cam shaft or the like thus having a separate cam for the exhaust valve 7 and separate cams for the sleeve 35 of the exhaust valve 7. Such cams are arranged symmetrically with respect to a sleeve arm 47 in a similar manner.

An opening 46 is also arranged on a side of the sleeve 35 of the exhaust valve 7. The opening 46, in this case, opens into the exhaust channel 8. The opening 46 is, in the axial direction of the sleeve 35, formed so large that a free flow route opens through the opening 46 and into the exhaust channel 8 independently of the axial position of the sleeve 35.

FIG. 7 illustrates the end phase of the expansion stroke, whereby the sleeve 35 with the valve has risen essentially half of its maximum position. Then, the sleeve 35 begins rising and the valve 7 starts descending. In such a situation, the piston 2 should essentially be in the lower position.

In the construction illustrated in FIG. 7, the movements of the valve and of the sleeve are thus timed at least partially opposite during the starting and/or closing phase of one stroke. This arrangement quite essentially speeds up the opening and/or closing of the flow opening. It is advantageous for the valve lifted by the sleeve near the piston surface to begin opening additionally as the piston descends. A corresponding additional opening made possible by the structure of the present invention can also be utilized in other phases of the gas exchange. Such a structure opens up a completely new solution for valve timings and makes possible an increase in the efficiency and power, which has not been previously possible.

In the situation illustrated in FIG. 6, both the suction valve 12 and the exhaust valve 7 are closed, and the sleeves 15 and 35 are correspondingly in the respective upper positions. This corresponds to the situation during the compression stroke and at least at the beginning of the expansion stroke. FIG. 7 illustrates an alternative embodiment for the valve and the sleeve. In this case, the exhaust valve 7 and the exhaust-valve sleeve 35 have penetrated into the combustion space 5, whereby the sleeve 35 and valve 7 together form a "piston" which reduces the volume of a combustion space 5.

The exhaust valve 7 and the related sleeve 35 are pushed to a position illustrated in FIG. 7, suitably during the end phase of the expansion stroke. At the start of the exhaust stroke, the sleeve 35 of the exhaust valve 7 starts rising upwardly as the exhaust valve 7 continuously descends. A flow route will then open very rapidly between the seat surface of the sleeve 35 and the exhaust valve 7 into the exhaust channel 8 for removal of the exhaust gases. At the end of the exhaust stroke, the valve 7 rises up. The sleeve 35 descends and at the start of the suction stroke the valve 7 closes against the seat surface of the sleeve 35 in a conventional manner as the suction valve opens.

In the embodiment of FIGS. 6 and 7, the operation of the suction valve 12 can completely correspond to that illustrated previously with respect to FIGS. 1-5. In contrast to the exemplary embodiments of FIGS. 1-7, the valve gear of the present invention may also comprise an arrangement in which only the exhaust valve 7 is provided with the previously-described sleeve 35, while the construction and operation of the suction valve 12 is completely conventional without any sleeve 15 as illustrated in the figures. If however, the sleeves 15 and 35 shown in the drawings are used in the suction 12 and exhaust 7 valves, then the exit of the exhaust gases from the combustion space 5 of the cylinder becomes even more efficient.

Each sleeve 15, 35 may be sealed with respect to the cylinder head 3 and to the boring corresponding to the respective sleeve 15, 35 in a manner such that the entry of exhaust gases or the fuel-air mixture into the channel 8, 13 corresponding to each sleeve 15, 35 is prevented from between the sleeve 15, 35 and the boring corresponding to the sleeve 15, 35. In other words, a seal may be provided between the sleeve 15, 35 and the head 3 which prevents the exhaust gases from discharging into the suction 13 and/or exhaust 8 channels.

Figure 8:
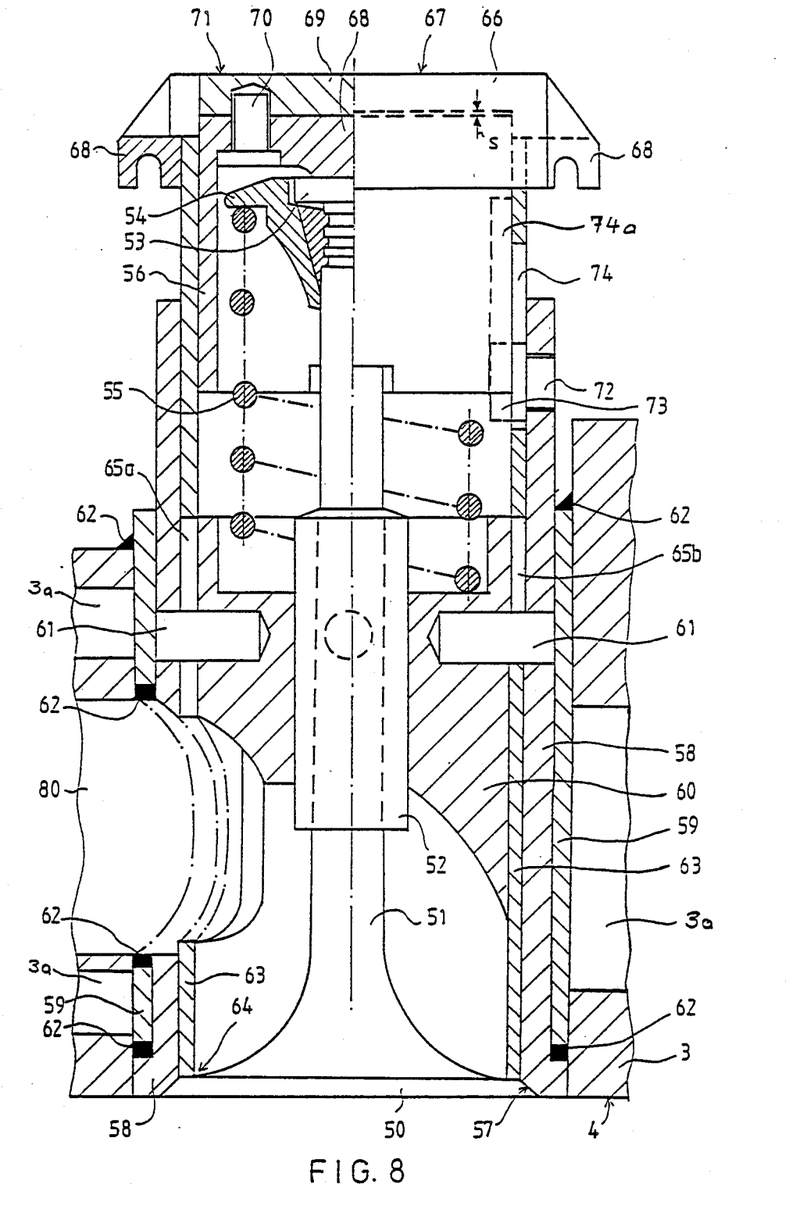
FIG. 8 is a partial sectional view of an alternative embodiment of a valve gear arrangement according to the present invention.
Figure 9:
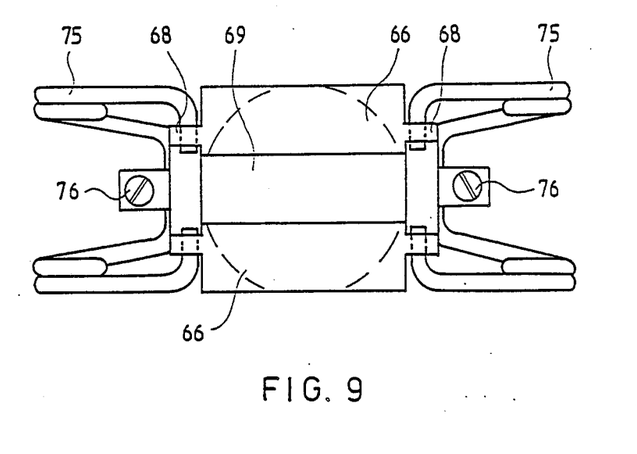
FIG. 9 is a view as seen from above of the construction of FIG. 8, when the springs of the sleeve are mounted in position.
Figure 10:
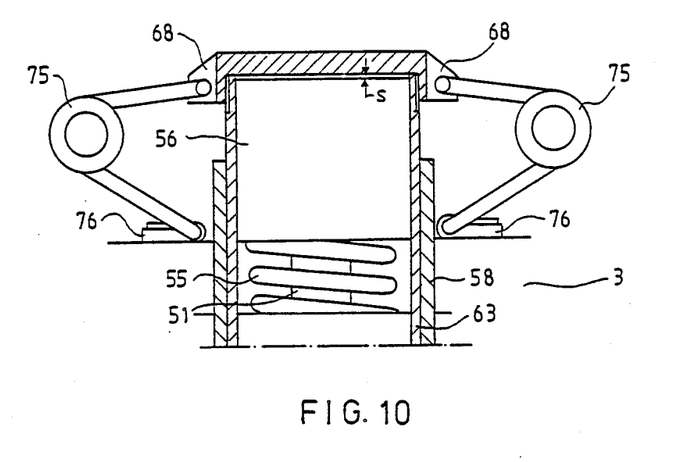
FIG. 10 is a sectional view of the structure of the upper end of the valve gear of FIG. 9.

FIGS. 8-10 illustrate an alternative embodiment for the valve gear in accordance with the present invention. In FIGS. 8 and 10, the cylinder head 3 is denoted with reference numeral 3 and the plane of the head 3 on the side of the cylinder space is noted with reference numeral 4. The channel opening into the cylinder is marked with reference numeral 80, while the valve is marked with reference numeral 50. In the structure of FIG. 8, a coaxial boring with respect to a valve shaft 51 is formed on the cylinder head 3. A fixed sleeve 58 is mounted into this boring, and has a seat surface 57 formed at a lower end thereof for the valve 50. The fixed sleeve 58 is immovably mounted with respect to the head 3 by means of a filler sleeve 59 which is fastened to the head 3, e.g., with weld joints 62. Openings corresponding to the shape of the channel 80 leading to the cylinder space are formed in the fixed sleeve 58 and the filler sleeve 59. Reference numeral 3a relates to water spaces formed on the head 3, and which extend to an outer surface of the filler sleeve 59 as illustrated.

A guide 60 is fitted inside the fixed sleeve 58 and has an outer diameter smaller than an inner diameter of the fixed sleeve 58, so that a circular gap remains between the fixed sleeve 58 and the guide 60. The guide 60 is immovably fastened in position, e.g. by means of fastening pins 61. The guide 52 of the valve 50 which guides the valve shaft 51, is fastened immovably to the guide 60. The guide 60 connects the channel 80 leading into the cylinder 3 to the opening which opens into the cylinder. In other words, a guide surface is formed on the guide 60 which smoothly connects the channel 80 to the valve opening which opens into the cylinder space.

In the circular gap formed between the fixed sleeve 58 and the guide 60, a moving sleeve 63 is fitted which corresponds to the sleeves 15 and 35 illustrated in FIGS. 1-7. The moving sleeve 63 is thus movably fitted coaxially with the valve 50. In order to make the moving sleeve 63 move in the circular gap, longitudinal openings 65a and 65b for the fastening pins 61 are axially arranged in the sleeve 63. Additionally, the opening 65a on the side of the channel 80 is formed such that independently of the position of the sleeve 63, a free gas flow is made possible from the channel 80 into the cylinder space.

An adjusting plate 53 and the necessary fastening elements 54 for a spring 55 are fitted at an upper end of valve shaft 51. The valve spring 55 is thus supported at an upper end thereof on the fastening elements 54 and at a lower end thereof on the guide 60 as illustrated. A cup 56 is fitted on the adjusting plate 53 and partially surrounds the spring 55. An end piece 66 is fitted on top of the cup 56 and is immovably fastened with respect to the moving sleeve 63, e.g. with a threaded joint 77 illustrated in FIG. 10. The upper surface of the cup 56 is located at a clearance S from the lower surface from the end piece 66.

In order to prevent the movable cup 56 from rotating with respect to its longitudinal axis, a guide screw 72 is mounted on the fixed sleeve 58 and a longitudinal guide groove 74a is formed in the cup 56 for the head 73 of the screw 72. The movable sleeve 63 is correspondingly provided with a groove 74. The upper surface of the end piece 66 is not uniform, but a longitudinal gap with respect to the axial direction of the valve 50 is arranged therein, and in which an additional piece 69 is fitted which in turn is rigidly fastened to the cup 56, e.g. with screw 70 illustrated in FIG. 8 or with corresponding fastening elements.

The additional piece 69 and the cup can thus move in the axial direction of the valve 50 with respect to the end piece 66. Ears 68 have been formed in the end piece 60 for the springs 75 of the moving sleeve 63. The springs 75 ar fastened at the opposite ends thereof to the cylinder head 3 with fastening elements 76. When the valve is in the closed position in accordance with FIG. 8, whereby both the moving sleeve 63 and the valve 50 are in the upper position thereof, a clearance 64 of the order of 0.5 mm remains between the lower end of the sleeve 63 and the valve collar 50.

The operation of the embodiment illustrated in FIGS. 8–10 is as follows. The valve 50 illustrated in FIG. 8 is, e.g. a suction valve, which is closed during the compression and expansion strokes. In this situation, both the moving sleeve 63 and the valve 50 are in the upper position thereof due to the effect of the springs 75 and 55, whereby the cams 21 and 22 on the cam shaft 20 illustrated, e.g., in FIGS. 3 and 4, do not affect the valve 50 or the sleeve 63. When transferring from the situation of FIG. 8 (expansion stroke) to the exhaust stroke, the cams 21 on the cam shaft 20 for the sleeve 63 press against the plane surfaces 67 of the end piece 66 on both sides of the additional piece 69. The moving sleeve 63 then begins descending, whereby the clearance 64 between the sleeve 63 and the valve 50 closes. At this phase, the valve cam 22 also starts affecting the additional piece 69, whereby both the sleeve 63 and the valve 50 together penetrate into the combustion space of the cylinder. In this situation, the valve 50 leans against a lower edge of the sleeve 63 when the valve 50 is closed. The valve 50 and the sleeve 63 thus form a piston-like piece, which during the exhaust stroke penetrates into the combustion space, thus essentially reducing the size of the combustion space. A counter-surface is formed on the lower edge of the sleeve 63 and is located against the upper surface of the valve collar 50, when the piston-like piece is so formed.

The movements of the valve 50 and the sleeve 63 are timed by means of the design of the cams 21 and 22, in such a way that when transferring from the exhaust stroke to the suction stroke, the sleeve 63 lifts up whereas the valve 50 keeps descending. Due to the effect of the mutually opposite movements of the valve 50 and the movable sleeve 63, the valve opens very rapidly so that at the start of the suction stroke the valve 50 rapidly transfers to a completely open position.

When transferring from to the suction stroke to the compression stroke, the valve 50 closes in a manner such that the movable sleeve 63 descends towards the valve 50 and the valve 50 rises up to contact the sleeve 63 when the closing occurs. After this, the valve 50 and the sleeve 63 rise up together, until the valve 50 contacts the seat surface 57. This illustrates the operation of the valve gear of FIG. 8 in simplified form; however, it is naturally clearly apparent that deviations from the above description are possible, e.g. with respect to the synchronization of the movements of the valve 50 and the sleeve 63 which can be readily arranged by means of the cams 21 and 22. The construction of FIGS. 8–10 can naturally also be applied in connection with exhaust valves, with the operation of the construction also occurring in a similar manner.

Figure 11:
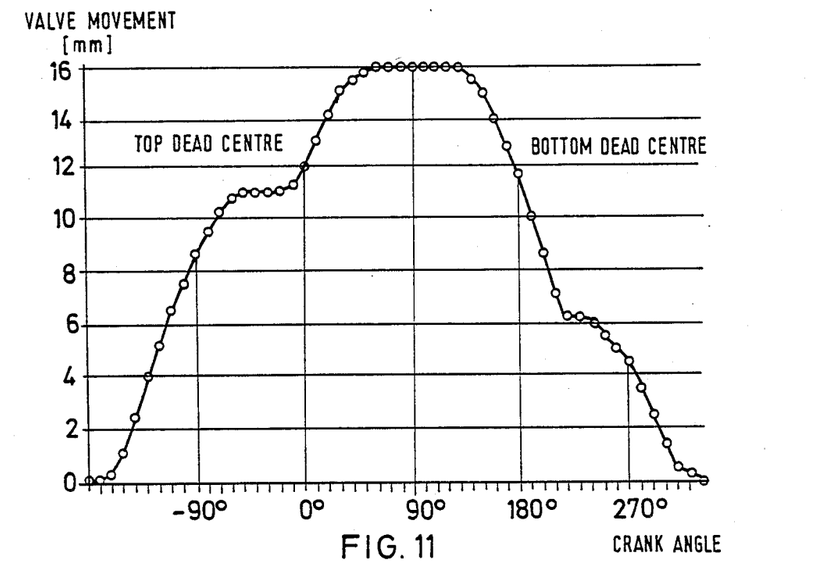
FIGS. 11-13 are graphic illustrations showing movements of the valve and of the sleeve as a function of the crank angle of the crankshaft.
Figure 12:
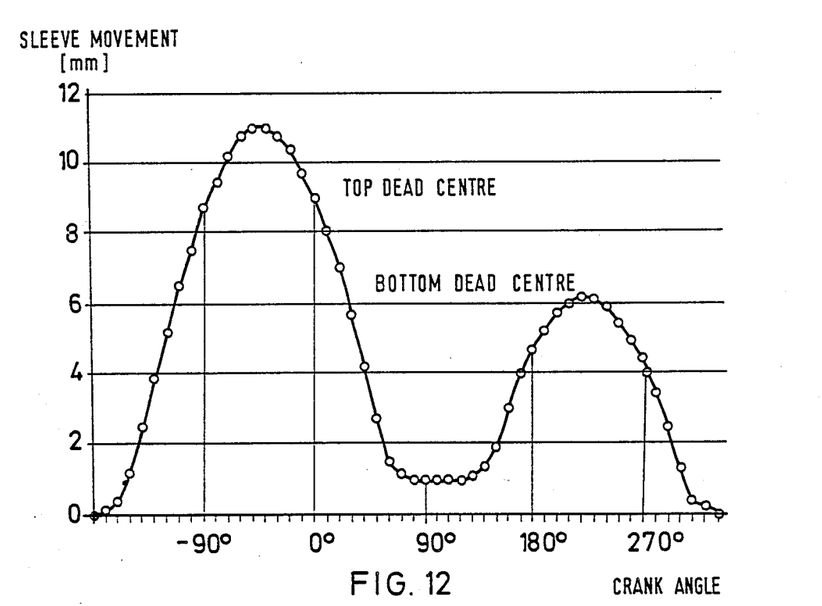
Figure 13:
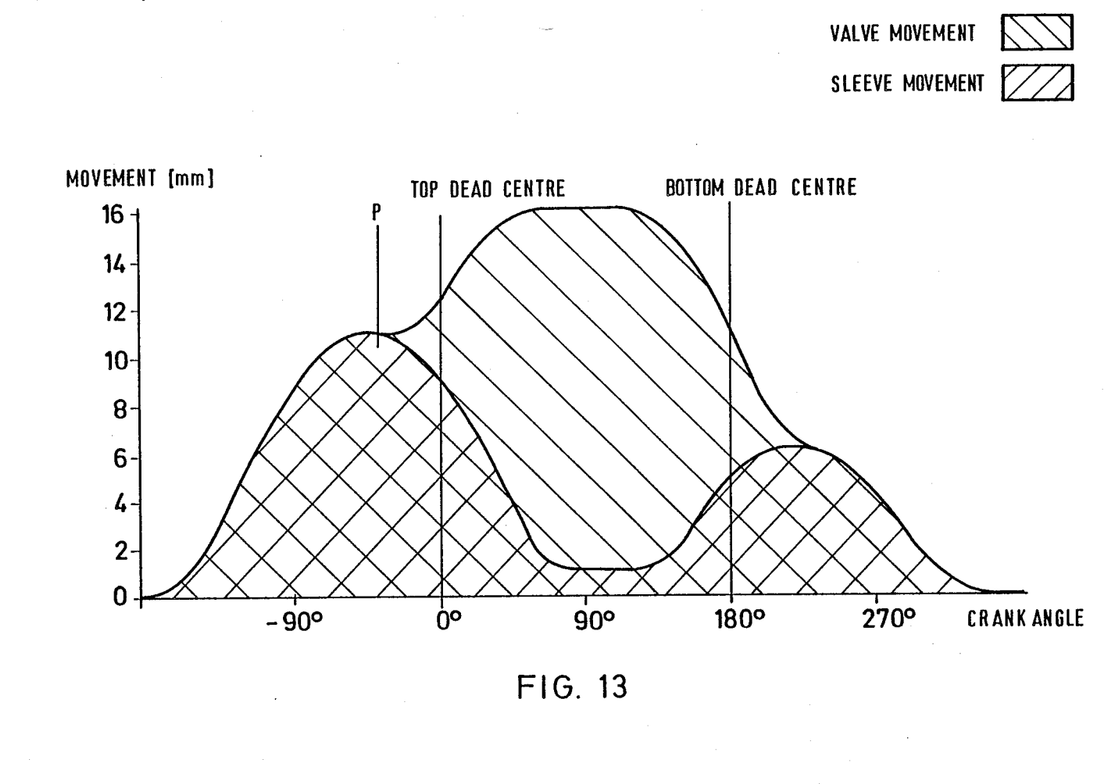
Figure 14:
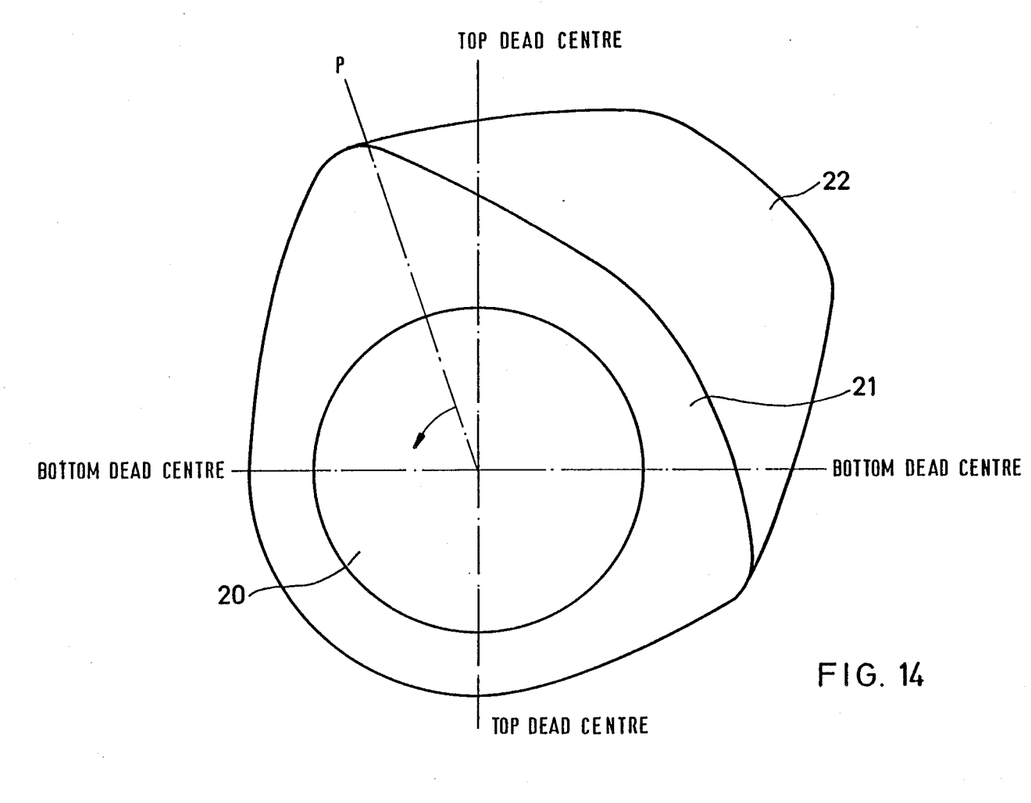
FIG. 14 is a schematic view of a cam shaft, by means of which the operation illustrated in FIGS. 11-13 is achieved.

The graphic illustrations of FIGS. 11–13 are intended to illustrate the effects which can be achieved by means of the solution of the present invention. FIG. 14 schematically illustrates how the cams 21 and 22 of the cam shaft 20 are to be designed to realize the goals of FIGS. 11–13. The graphic illustrations show the movable distance of the valve 50 and the movable sleeve 63 from the plane of the head to the cylinder space as a function of the crank angle. The graphic illustrations specifically refer to the operation of the suction valve 50 and the related sleeve 63.

The graphic illustrations are based on a situation in which an exhaust stroke prevails in the cylinder, in which case the suction valve 50 is naturally closed. When the piston starts rising up from the bottom dead center for the exhaust stroke which in FIGS. 11–13 is marked at −180° of the crank angle, towards the cylinder head, both the sleeve 63 and the suction valve 50 begin penetrating into the combustion space. The start of the movement of the valve 50 and the sleeve 63 can, in fact, be timed in another manner, i.e. the start of their movement does not have to occur at the point shown in FIGS. 11–13.

During the exhaust stroke, the valve 50 and the related sleeve 63 thus penetrate into the combustion space together in such a manner that the lower edge of the sleeve 63 is located tightly against the valve collar 50, i.e. the clearance 64 illustrated in FIG. 8 is completely closed. Thus, the valve 50 and the sleeve 63 together form a cylinder-like piece which, when penetrating into the combustion space, reduces the combustion space and facilitates the exit of the exhaust gases during the exhaust stroke.

The valve 50 and the sleeve 63 penetrate into the combustion space in such a manner that when the piston is at its top dead center, a sufficient gap (e.g. of the order of 1 mm) remains between the piston end and the valve 50. In accordance with FIGS. 11–13, the direction of the movement of the sleeve 63 changes considerably before the piston reaches its top dead center and it starts returning toward the plane of the head. In FIGS. 11–13, this point is marked with the reference character P. From this point, the valve 50 keeps opening into its extreme position for the duration of the exhaust stroke. At the point P, a gap starts thus-forming between the valve 50 and the sleeve 63, i.e. the valve opens. The location of the point illustrated in the figures can be varied, if desired.

In other words, when opening the valve 50, the sleeve 63 is first arranged to move in a direction of movement of the valve 50, after which the sleeve 63 is arranged to change its direction of movement in an opposite direction with respect to the direction of movement of the valve 50.

In the valve gear according to the present invention, the suction valve 50 can, however, be opened considerably earlier than in conventional valve constructions, since in the solution of the present invention the combustion gases flowing out of the exhaust valve as well as the fuel-air mixture flowing in from the suction valve cannot mix with each other. Furthermore, the fuel-air mixture does not flow directly into the exhaust channel via the exhaust valve. This is caused by the fact that the gases escaping from the cylinder and the fuel-air mixture flowing into the cylinder are located in different layers in the cylinder, since the suction valve 50 and the sleeve 63 penetrate inside the combustion space. Thus, the opening state of the suction valve 50 is considerably longer than that of conventional solutions without the drawbacks related to a long-lasting opening state of the suction valve, such drawbacks being common in high-trimmed engines. The valve gear of the present invention thus improves the engine output without related drawbacks, such as an uneven operation and impure exhaust gases of the engine.

The valve lifted by the sleeve near the piston surface starts opening additionally as the piston descends and/or the corresponding additional opening made possible by the construction of the present invention is also utilized in other phases of the gas exchange.

The graphic illustrations (FIGS. 11-13) clearly show that the opening of the valve 50 occurs considerably more rapidly that in conventional constructions. This is caused by the fact that after the point P, the valve 50 and the sleeve 63 move in opposite directions. Similarly, the closing of the valve 50 occurs very rapidly, since also in this case the valve 50 and the sleeve 63 move in opposite directions.

When the piston starts approaching the bottom dead center which in FIGS. 11-13 occurs at 180° of the crank angle, then the valve 50 begins to close. Similarly, the sleeve 63 again changes its direction of movement, i.e. the sleeve 63 again starts penetrating into the combustion space.

The valve 50 and the sleeve 63 contact each other slightly after the bottom dead center, whereby the sleeve 63 once more changes its direction of movement and moves with the valve 50 to the plane of the head for the duration of the compression and the expansion stroke. In other words, when closing the valve 50, the sleeve 63 is first arranged to move in an opposite direction with respect to the direction of movement of the valve 50 and when the valve 50 and the sleeve 63 contact each other, the sleeve 63 is then arranged to change its direction of movement according to the direction of movement of the valve 50.

It can be observed from the graphic illustrations that the present invention considerably extends the opening-state time of the valve 50 and in addition, the opening and closing of the valve 50 occur very rapidly. FIG. 14 schematically illustrates how the operation of the valve 50 and the sleeve 63 shown in FIGS. 11-13 can be achieved by means of a proper design of the valve cam 22 and the sleeve cams 21. However, FIG. 14 is to be regarded only as an example of the design of the cam shaft 20.

Thus, in the present invention, the sleeve 15, 63 fitted in connection with the suction valve 12, 50 is arranged, together with the suction valve 12, 50, to penetrate during the end phase of the exhaust stroke into the combustion space 5 in such a manner that the suction valve 12, 50 and the sleeve 15, 63 corresponding to the valve 12, 50 together form a piston-like piece which essentially reduces the volume of the combustion space. During the expansion stroke, the sleeve 35, 63 fitted in connection with the exhaust valve 7, 50 is, together with the exhaust valve 7, 50 corresponding to the sleeve 35, 63, arranged to penetrate into the combustion space 5 in a manner such that the exhaust valve 7, 50 and the sleeve 35, 63 together form a piston-like piece which essentially reduces the volume of the combustion space 5. Finally, the movements of the sleeve and the valve are, during the starting and closing phase of a certain stroke, timed to be at least partially opposite, which essentially speeds up the opening and/or closing of the flow opening.

The invention has been described above by way of exemplary embodiments only with reference to the accompanying figures. However, it is not intended to limit the present invention to the examples shown in the figures. Rather, many modifications are possible within the scope of the concepts of the present invention set forth above. Accordingly, the preceding description of the present invention is merely exemplary, and is not intended to limit the scope thereof in any way.

What is claimed is:

1. A valve gear for an internal combustion engine having at least one cylinder, a piston reciprocating in the cylinder, a cylinder head mounted on an upper end of the cylinder and in which at least one exhaust valve opening into an exhaust channel and at least one suction valve opening into a suction channel are arranged, the exhaust and suction valves being operated by transmission of a cam shaft or equivalent element, wherein in the cylinder head, at least one of the valves is provided with a sleeve mounted for coaxial movement in the same direction as the respective valve for changing volume of a combustion space defined in the cylinder in a force-controlled manner periodically during crankshaft rotation, whereby said sleeve is arranged to individually penetrate from the cylinder head into the combustion space with the respective valve for reducing the combustion space.

2. The combination of claim 1, wherein said sleeve is fitted around the suction valve.

3. The combination of claim 1, wherein said sleeve is fitted around the exhaust valve.

4. The combination of claim 1, comprising two said sleeves, each being fitted around the suction valve or the exhaust valve.

5. The combination of claim 1, additionally comprising
a seat surface formed on a lower edge of said sleeve for the respective valve.

6. The combination of clam 1, additionally comprising
a counter-surface formed on a lower edge of said sleeve and located against an upper surface of a collar of the respective valve.

7. The combination of claim 1, additionally comprising
an opening formed through a side surface of said sleeve and through which a flow route opens from said sleeve and into the suction or exhaust channel adjacent the respective valve.

8. The combination of claim 1, wherein the cylinder head comprises a coaxial boring formed therein with respect to a shaft of the respective valve and in which said sleeve is movably fitted.

9. The combination of claim 8, additionally comprising a fixed sleeve immovably fitted with respect to the head in the boring,
with said movable sleeve being fitted inside said fixed sleeve.

10. The combination of claim 9, additionally comprising
a fixed guide with respect to the cylinder head fitted inside said movable sleeve,
with said guide and fixed sleeve defining a circular gap space in which said movable sleeve is movably fitted.

11. The combination of claim 10, wherein said guide comprises a surface defining a passage for interconnecting the exhaust or suction channel with an opening in the valve in turn opening into the combustion space.

12. The combination of claim 8, wherein said sleeve is sealed with respect to the cylinder head and boring in a manner such that entry of exhaust gas or fuel-air mixture into the exhaust or suction channel from between said sleeve and the boring is prevented.

13. The combination of claim 8, wherein, when said sleeve is in an upper position with respect to the cylinder head, a bottom of said sleeve is situated to contact a bottom of the boring formed in the cylinder head.

14. The combination of claim 2, wherein said sleeve is arranged together with the suction valve to penetrate into the combustion space during an end phase of an exhaust stroke in a manner such that the suction valve and said sleeve together form a piston-like piece which essentially reduces the volume of the combustion space.

15. The combination of claim 3, wherein said sleeve is arranged together with the exhaust valve to penetrate into the combustion space during an expansion stroke in a manner such that the exhaust valve and said sleeve together form a piston-like piece which essentially reduces the volume of the combustion space.

16. The combination of claim 1, additionally comprising a seal situated between said sleeve and the cylinder head which prevents exhaust gas from discharging into the suction or exhaust channel.

17. The combination of claim 1, wherein said sleeve and the valve are arranged such that movements of the same during starting and closing phases of a certain stroke are timed to be at least partially opposite which essentially speeds up opening or closing of a flow opening in the respective valve.

18. The combination of claim 1, wherein said sleeve and the valve are arranged such that when opening the valve, said sleeve is first arranged to move in a direction of movement of the valve, and then said sleeve is arranged to change direction of movement to an opposite direction from the direction of movement of the valve.

19. The combination of claim 1, wherein said sleeve and the valve are arranged such that when closing the valve, said sleeve is first arranged to move in an opposite direction from direction of movement of the valve, and when the valve and said sleeve contact each other, said sleeve is arranged to change direction of movement according to the movement direction of the valve.

20. A valve for an internal combustion engine comprising a separate sleeve arranged for coaxial movement in the same direction as the valve when the valve and said sleeve are situated in a cylinder head of the engine,
whereby said sleeve individually penetrates into a combustion space in the engine from the cylinder head with the valve, and reduces volume of the combustion space.

* * * * *